US005975495A

United States Patent [19]

Berends et al.

[11] Patent Number: 5,975,495

[45] Date of Patent: Nov. 2, 1999

[54] LIFT

[75] Inventors: Jan Berends; Jurjen Jan De Jong, both of Buitenpost, Netherlands

[73] Assignee: Stertil B.V., Kootstertille, Netherlands

[21] Appl. No.: 09/022,273

[22] Filed: Feb. 11, 1998

[51] Int. Cl.[6] ....... B60P 1/00

[52] U.S. Cl. ....... 254/2 B

[58] Field of Search ....... 254/2 B, 8 B

[56] References Cited

U.S. PATENT DOCUMENTS

| | | | |
|---|---|---|---|
| 1,638,790 | 8/1927 | Weaver | 254/2 B |
| 2,937,002 | 5/1960 | Schultz | 254/2 B |
| 3,044,747 | 6/1962 | Nolden | 254/2 B |
| 4,645,181 | 2/1987 | Schapansky | 254/2 B |

FOREIGN PATENT DOCUMENTS

| | | | |
|---|---|---|---|
| 512001 | 4/1955 | Canada | 254/2 B |

*Primary Examiner*—David A. Scherbel
*Assistant Examiner*—Daniel G. Sherley
*Attorney, Agent, or Firm*—Evenson, McKeown, Edwards & Lenahan, PLLC

[57] ABSTRACT

The invention relates to a lift, comprising:

a stand, comprising a substantially upright and hollow profile with an opening along at least one longitudinal side thereof and a safety device;

a carriage arranged in said profile with a support extending through said opening in said longitudinal side and a row of protrusions co-acting with said safety device, said carriage having smaller dimensions than said opening;

a drive connected to said carriage and said stand to respectively raise and lower said carriage through said stand; and a plurality of first guides connected to said lower part of said carriage, maintaining said carriage inside said stand, where said safety device is arranged near the top side of said carriage in a lowered position and at least one second guide is connected to said carriage in a lowered position near the top side thereof in stiffening contact with said profile.

6 Claims, 3 Drawing Sheets

LIFT

FIELD OF THE INVENTION

The present invention relates to a lift, for example a transportable or moveable lift, where a carriage is driven in an up and downward movement in a stand. The stand is formed by a profile, for example a C-shaped profile, in which the carriage is limited to a rectilinear movement by means of guides.

BACKGROUND OF THE INVENTION

Such a lift, which can be used in the field to raise cars, busses and similar objects is generally known, for instance the "car lifts" sold by Stertil B. V. from Kootstertille of the Netherlands. In these lifts, in order to limit the quantity of material needed for the stand, the guides connected to the carriage are arranged along exclusively the lower part of the carriage, and as a result the height of the stand, required for a predetermined range of movement by the carriage, is limited, without diminishing the aforementioned range. Also a limitation on the height of the stand is desired to provide a lift with a centre of gravity as low as possible to enhance stability thereof, especially to comply with the requirement, that even on a 10° slope the lift should be stable enough for transport without the risk of it falling over. However, the stand needs to be provided with safety means to prevent the carriage from dropping or falling down in case of a malfunction of a drive of the carriage, from any height within the range.

Thus the lift is also equipped with a safety device, such as a safety catch, which is arranged on said stand near the top of said carriage in the lowered position thereof. Usually this safety device is arranged opposite the longitudinal side of the stand with an opening, through which the carriage is connected to a support, which actually serves to engage the object to be lifted.

Especially near the fully lowered position of the carriage in relation to the stand with a load resting on the support, when the distance between the uppermost of the guides and the safety device is greatest, the top of the carriage tends to bend out of the stand as a result of a number of factors. Among these are the elasticity of the carriage, the wheels and the stand under influence of the weight resting on the support. If this occurs while the carriage is resting on the safety device, which is most effective in a purely vertical direction, the carriage may bend to such an extent, that the safety device becomes unreliable and loses grip on the protrusion, which at this point is supposed to be engaged by the safety device. Thus the carriage may at least deform or even fall, taking the support and the load resting thereon with it, causing damage to the car-lift as well as the load resting thereon.

SUMMARY OF THE INVENTION

The present invention has for its object to obviate the above mentioned disadvantages of a known lift. This is achieved by providing at least one second guide connected to said carriage in a lowered position near the top side thereof to prevent the carriage from bending out of the opening in the stand in the aforementioned lowered positions. This second guide becomes inoperative (slides out of the stand), only when the carriage is raised to such a height, that the safety device and the first guides are close enough to one another to effectively prevent the carriage from bending out of the stand. Above this point the second guide can be positioned above the top of the stand, whereby the minimum length of the stand is also determined.

In a preferred embodiment the second guide comprises a plate arranged near the top of said carriage with a shape formed to abut against edges of the profile forming the stand along the opening therein, particularly in a lowered position of the carriage, i.e. below the position where the first guides and the safety device coact sufficiently to prevent the carriage from bending out of the stand.

Other objects, features and advantages of the present invention will become apparent from the following description of the invention, which refers to the accompanying drawings.

BRIEF DESCRIPTION OF THE DRAWINGS

In the figures, corresponding components are designated by the same numerals.

DESCRIPTION OF THE PREFERRED EMBODIMENTS

Figure 1:
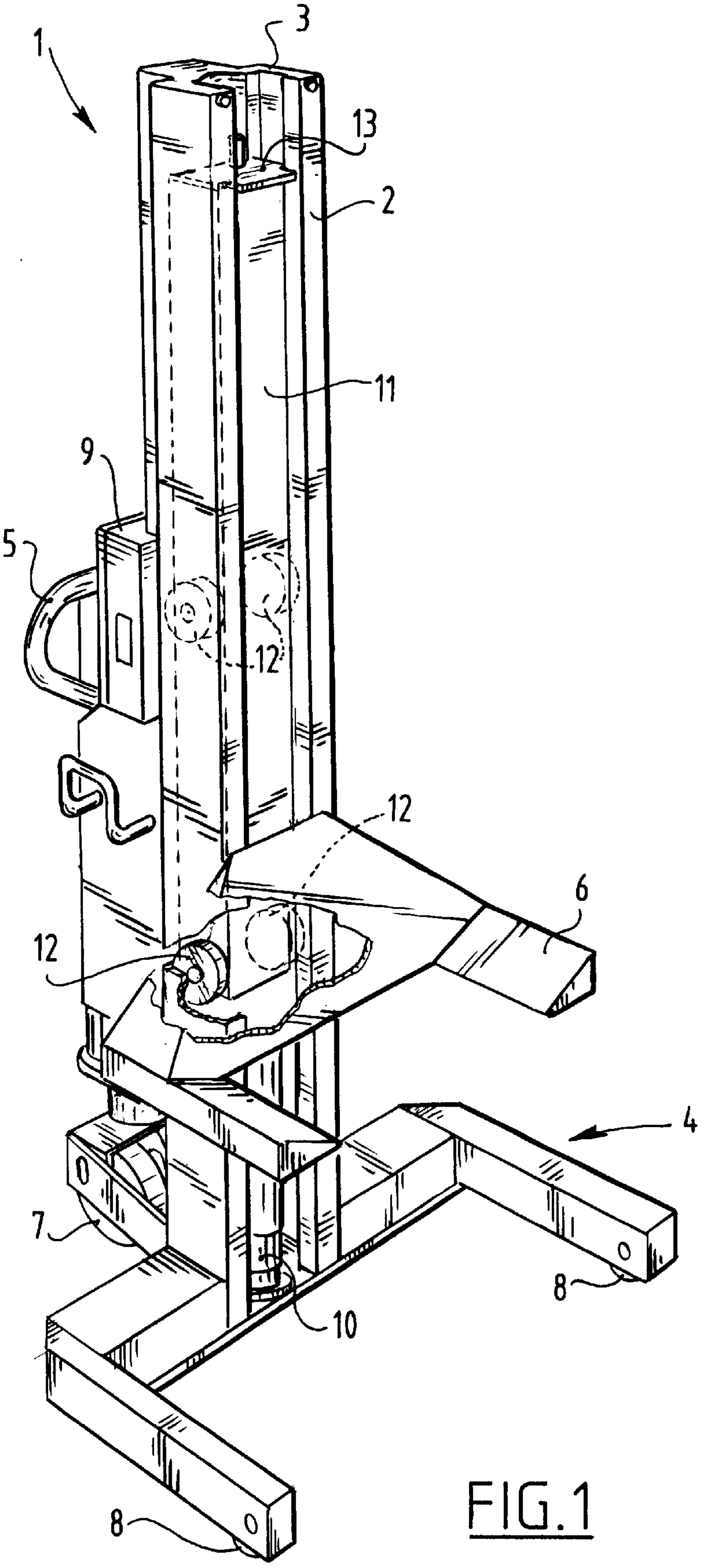
FIG. 1 is a representation in perspective view of a lift according to the present invention.

In FIG. 1 a lift according to the present invention is shown, which comprises a base 4, a stand 2 extending in an upward direction from said base 4 and a support 6 moveable along the length of the stand 2.

The base 4 rests on transport wheels 7 and additional wheels 8 for transport of the entire lift 1.

Figure 2:
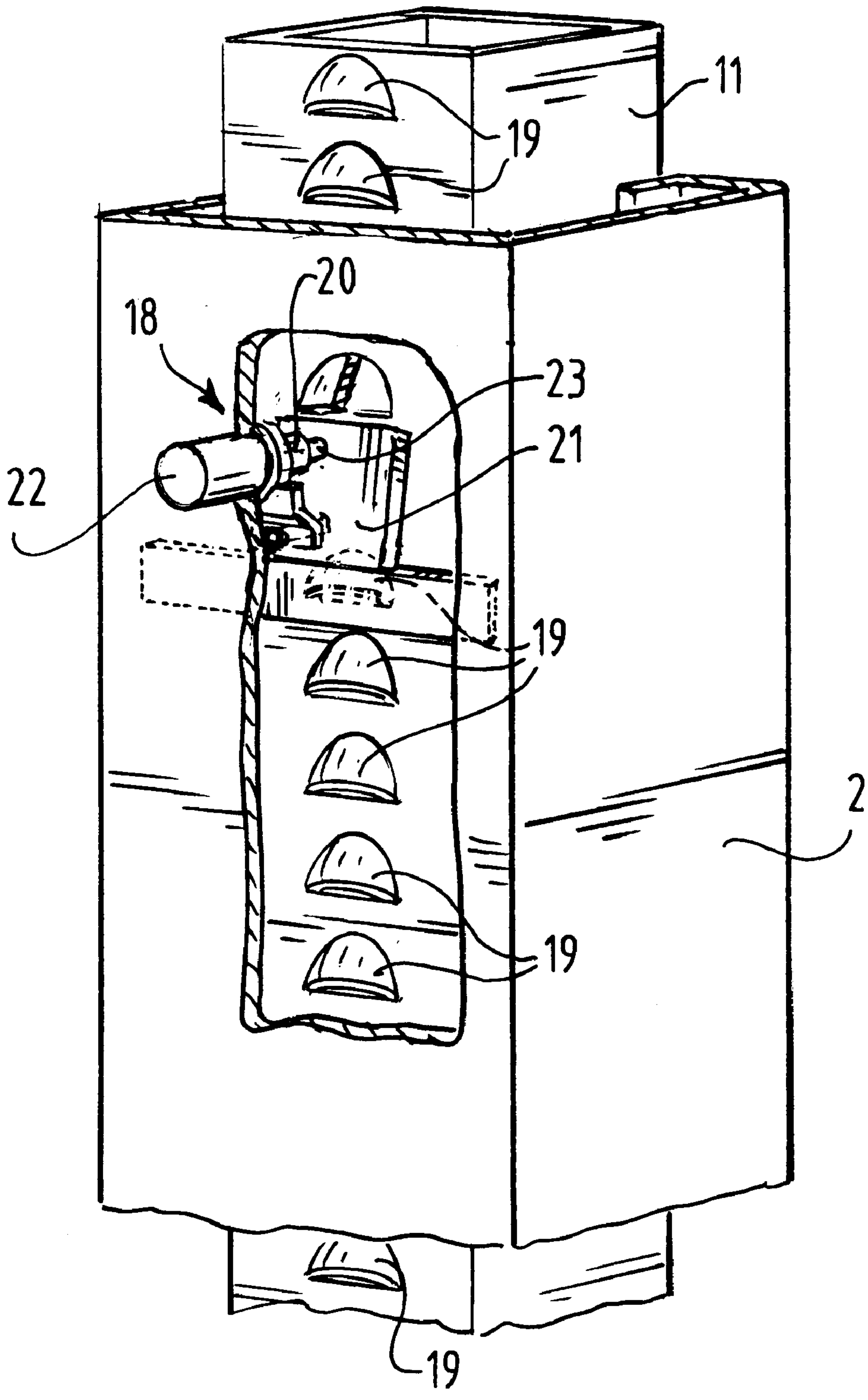
FIG. 2 is a representation in perspective view of a detail at the back of the lift shown in FIG. 1.

A carriage 11 is placed in the stand 2, which to this end is formed by a C-profile, of which the free ends are turned inward to form U-shaped portions of the C-shaped profile. This is shown more clearly in FIGS. 2, 3 and 4. Thus the stand 2 is hollow and the carriage 11 is moveable through the inside thereof. To this end the carriage 11 is provided with guide wheels 12, of which a pair is arranged at the lower side of this carriage 11, and another pair is arranged at approximately half the height of this carriage 11.

Below the carriage 11 and in the stand 2 a cylinder 10 is arranged to impart an upward movement on the carriage 11. With the cylinder 10 the carriage can be pushed up or eased down, such that a load resting on the support 6, which is connected to the carriage 11, can be lifted or lowered to a desired height. The top of the stand is provided with a cover 3 intended to close off that section of the stand 2 formed by the C-shaped profile, complementing the area taken by a section of the carriage 11.

The lift 1 is provided with a grip 5 for a user, which serves to steer and possibly drag the lift during transport. Also the lift 1 is provided with a control 9, relevant for the situation where several of the lifts 1 shown here are to be driven synchronically in order to lift a vehicle in combination. A pump mechanism (not shown) connected to the grip 5 is known per se in the art, therefore this is not described further herein.

The stand 2 is provided with a safety catch 18, formed by a mechanism arranged to grasp the bottom side of protrusions 19, which are arranged on the opposite side of the carriage 11 relative to an opening in the stand 2, through which the carriage 11 is connected to the support 6.

The safety catch 18 is arranged on the stand 2, to grasp the protrusions 19 in the stand 2, at a height slightly below the top of the carriage 11 in a lowered position thereof. Thus the safety catch 18 is effective over the entire range, within which the carriage 11 can be moved upward from this lowered position thereof. The protrusions are provided in a range corresponding to the above mentioned range.

The safety catch 18 is used to prevent the carriage 11 from collapsing down into the stand 2 in case of malfunction of the cylinder 10, as shown in FIG. 1, or is simply activated to be able to release the pressure on the cylinder 10, once the required height of the support is reached.

The safety catch 18 comprises a plate 21 forming a ratchet element and connected to the inside of stand 2 such, that it can pivot at the lower edge thereof towards and from the carriage 11 under control of a solenoid 22. The solenoid 22 is controlled by the control 9 mentioned above in reference to FIG. 1. The protrusions 19 are formed under a slight angle relative to the side of the carriage 11, where the plate 21 can slide over the protrusions 19 in an upward movement of the carriage. Further the bottom side of the protrusions 19 is formed under an acute angle relative to the side of the carriage 11, such that the plate 21 will support this bottom side of a protrusion 19 in a downward movement of the carriage 11, when the solenoid 22 is in an extended state whereby the plate 21 forms a rest. With the expression, that the solenoid 22 is extended of course is meant, that a central shaft 23 in the center of the solenoid 22 is moveable in the longitudinal direction thereof along the central axis of the solenoid 22 to a position extending through hole 20. The hole 20 is referred to in FIG. 2, but is actually not visible here, as surrounding parts of the stand 2 are removed in this drawing to allow for a view of the interior of the stand 2 and the carriage 11 therein.

In order to minimize the quantity of material needed for the stand 2 the wheels 12 keeping the carriage 11 inside the stand 2, to counteract a tilting force exerted by a load via the support 6 on the carriage 11, are arranged on a lower part of the carriage 11.

When a load is resting on the support 6 and the carriage 11 in a relatively low position thereof, the top of the carriage 11 tends to bend out of the stand 2 as a result of the horizontally oriented force components generated at the plate 21 of safety catch 18 and caused by weight of the load resting on the support 6 in combination of certain elasticities of the carriage, the wheels and the stand. The amount of play of the carriage 11 relative to the stand 2, however minute, has to be countered, as otherwise the risk exists, that the plate 21 loses its grasp on the protrusion, which at that point in time rests on the plate 21 due to increase of the aforementioned horizontal force component with an increase in the extent in which the carriage 11 is bent out of the stand 2 at the top side thereof near the safety catch 18. Once the carriage 11 is raised to a sufficient height, where the distance between the safety catch 18 and the uppermost of the wheels 12 is decreased, this above mentioned risk is also decreased, as the uppermost of the wheels 12 have a stiffening effect on the stand 2 and the carriage 11. It is noted here, that the lift 1 with a minimized length of the stand 2 becomes more reliable, the higher the carriage 11 is raised. In a relatively low position of the carriage 11 measures counteracting forces acting on the carriage 11 to bend out of the stand 2 have to be taken; in the embodiment of FIG. 1 this is accomplished by the feature of plate 13 at the top of the carriage 11.

Figure 3:
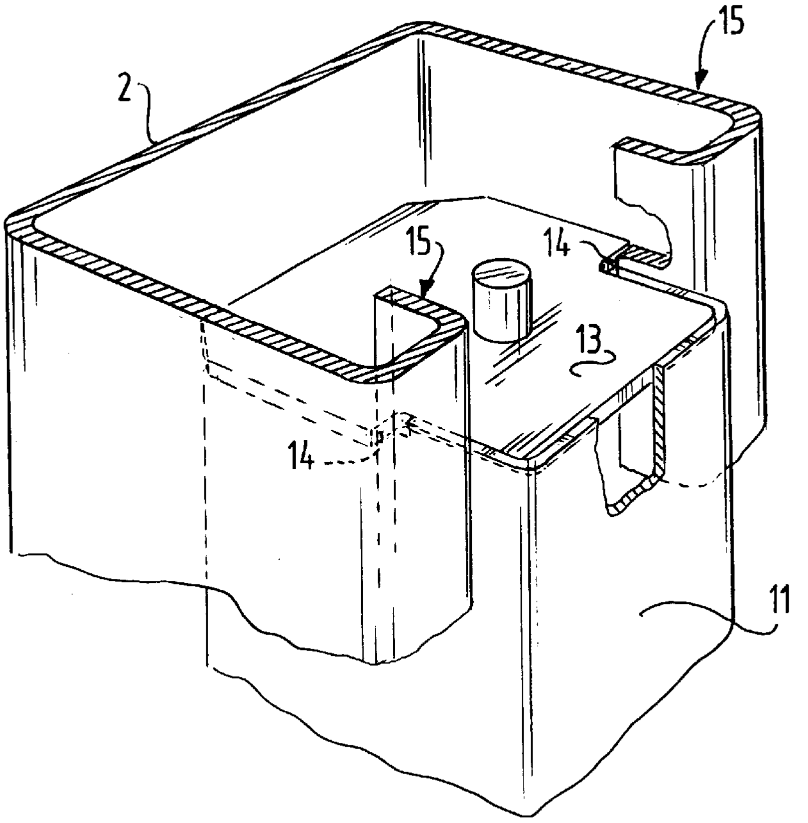
FIG. 3 shows a detail of the lift in FIG. 1.

This plate 13 is also shown in FIG. 3, which is a perspective view of a detail of the configuration shown in FIG. 1.

From FIG. 3 it is clear, that on either side of the opening, through which opening the carriage is connected to the support 6, the stand 2 is provided with U-shaped portions 15. Here the plate 13 is designed to abut against the free edge of these U-shaped portions 15. Thus an improved stiffness of the combination of the carriage 11 and the stand 2 is achieved with the shoulders 14 in the shape of the plate 13, which actually abut against the free ends of the U-shaped portions 15.

Figure 4:
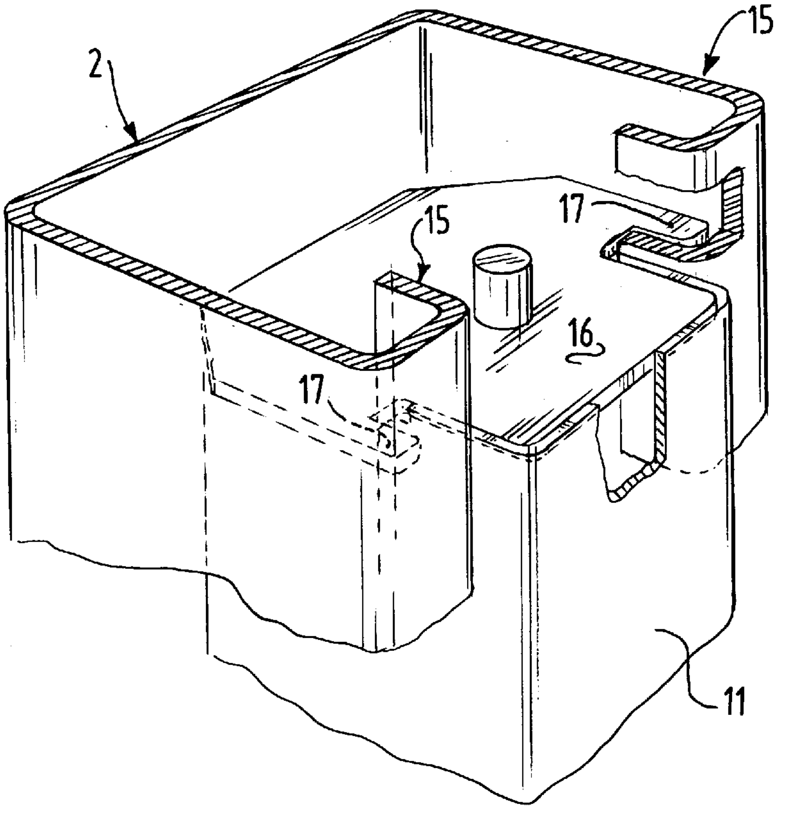
FIG. 4 shows an alternative configuration to the one shown in FIG. 3.

An alternative embodiment to the one shown in FIG. 3 is depicted in FIG. 4, where a different plate 16 is provided with extensions 17 extending into the hollow shape, defined by the U-shaped portions 15 of the stand 2. In this embodiment naturally the configuration of cover 3 in FIG. 1 has to be adjusted such, that the plate 16 can pass along this adjusted cover to enable the top of the carriage 11 to pass along the top of the stand 2.

Many other embodiments of the present invention can be envisaged by a person skilled in the art, such as an additional set of wheels near the top of the carriage 11; slide blocks abutting against sides of the opening in the stand 2 near the top of the carriage 11; additional protrusions extending from the sides of the carriage not being the side with the protrusions 19 or the connection to the support 6, and also abutting against the sides of the opening formed in the stand 2, etcetera. Thus it is apparent to a person skilled in the art, that the appended claims should not be limited to the embodiments disclosed hereinabove.

We claim:

1. A lift comprising a stand, comprising a substantially upright and hollow profile with an opening along at least one longitudinal side thereof and a safety device;

a carriage arranged in said profile with a support extending through said opening in said longitudinal side and a row of protrusions co-acting with said safety device, said carriage having smaller dimensions than said opening;

a drive connected to said carriage and said stand to respectively raise and lower said carriage through said stand; and a plurality of first guides connected to a lower part of said carriage thereby maintaining said carriage inside said stand, wherein said safety device is arranged on said stand near a top side of said carriage when said carriage is in a lowered position, and at least one second guide is connected near an upper part of said carriage in stiffening contact with said profile.

2. Lift according to claim 1, where the second guide comprises a plate arranged at the top of said carriage and with a shape to abutt against edges of said profile along said opening.

3. Lift according to claim 1, where the safety device comprises a rest on which any one of said protrusions is supportable at one time, and said protrusions in side view are sawtooth shaped with substantially horizontal first sections below second sections slanting downward and away from the surface of said carriage.

4. Lift according to claim 3, where said rest comprises a substantially upright rotatable ratchet element.

5. Lift according to claim 4, where said ratchet element is connected to a drive forcing said ratchet element against the surface with said row of protrusions of said carriage.

6. Lift according to claim 1, where said stand is substantially C-shaped.

* * * * *